United States Patent
Monari et al.

(10) Patent No.: US 9,407,196 B2
(45) Date of Patent: Aug. 2, 2016

(54) METHOD TO COMMAND AND CONTROL THE ELECTRIC MOTOR OF AN AUTOMATION UNIT AND CONNECTED SYSTEM

(71) Applicant: GIMA TT S.R.L., Ozzano dell'Emilia (IT)

(72) Inventors: Iuri Monari, Anzola dell'Emilia (IT); Fiorenzo Draghetti, Medicina (IT)

(73) Assignee: GIMA TT S.P.A., Ozzano dell'Emilia (IT)

( * ) Notice: Subject to any disclaimer, the term of this patent is extended or adjusted under 35 U.S.C. 154(b) by 311 days.

(21) Appl. No.: 14/351,787

(22) PCT Filed: Oct. 15, 2012

(86) PCT No.: PCT/IB2012/002045
§ 371 (c)(1),
(2) Date: Apr. 14, 2014

(87) PCT Pub. No.: WO2013/054179
PCT Pub. Date: Apr. 18, 2013

(65) Prior Publication Data
US 2014/0239868 A1   Aug. 28, 2014

(30) Foreign Application Priority Data
Oct. 13, 2011   (IT) .............................. MI2011A1867

(51) Int. Cl.
| H02P 7/06 | (2006.01) |
| H02P 31/00 | (2006.01) |
| G05B 19/404 | (2006.01) |
| G05B 19/416 | (2006.01) |

(52) U.S. Cl.
CPC ............. *H02P 31/00* (2013.01); *G05B 19/404* (2013.01); *G05B 19/416* (2013.01); *G05B 2219/41157* (2013.01)

(58) Field of Classification Search
CPC .. E05F 15/603; E05F 15/668; E05Y 2400/30; E05Y 2400/337; E05Y 2400/456
See application file for complete search history.

(56) References Cited

U.S. PATENT DOCUMENTS 4,843,292 A   6/1989 Ono et al.

FOREIGN PATENT DOCUMENTS

EP   1815972 A2   8/2007

OTHER PUBLICATIONS

Written Opinion and International Search Report from PCT/IB2012/002045 mailed Apr. 3, 2013.

*Primary Examiner* — Shawki S Ismail
*Assistant Examiner* — Zoheb Imtiaz
(74) *Attorney, Agent, or Firm* — Calfee Halter & Griswold LLP

(57) ABSTRACT

Method to command and control an electric motor of an automation unit. The unit comprises a mechanical member, driven by a drive shaft, a central command and control unit, and a position detection mean. The method provides that the central command and control unit receives the position signals of the shaft of the electric motor and/or of the mechanical member from the position detection mean, divides the operating cycle into a plurality of sub-phases equal with respect to each other, consisting of elementary units and, for each of said sub-phases, or multiple of sub-phases, selects predefined or self-learnt current reference values, and generates a signal consisting of an instantaneous current reference (feed forward) for the electric motor.

7 Claims, 3 Drawing Sheets

FF sent as function of self-learned tables and sub-phases n and speed of cycle

METHOD TO COMMAND AND CONTROL THE ELECTRIC MOTOR OF AN AUTOMATION UNIT AND CONNECTED SYSTEM

CROSS-REFERENCE TO RELATED APPLICATION

This application is the U.S. national phase entry of PCT/IB2012/002045, with an international filing date of 15 Oct. 2012, which claims the benefit of Italian Application Serial No. MI2011A001867, with a filing date of 13 Oct. 2011, the entire disclosures of which are fully incorporated herein by reference.

FIELD OF THE INVENTION

The present invention concerns a method to command and control an automation unit, as well as the connected system, which have at least one electric motor directly connected to the mechanical member.

BACKGROUND OF THE INVENTION

It is known that automation units can comprise at least one electric motor connected to a mechanical member either by means of a reduction device, or directly. It is known that eliminating an intermediate reduction stage is a positive factor in that it allows to limit play, increase precision, reduce the power consumed as well as to use simpler systems and/or with fewer components.

Generally, systems that have a very modest reduction between the motor member and the mechanical member, in the order of no more than around ten units, are also included in direct motion systems. More precisely, at least in the present invention, those systems in which the inertia of the motor is higher than twice the inertia of the mechanical member are considered direct motion systems.

In direct motions, the electric motors, which are generally and advantageously, but not only, the brushless type, can be subject to inertial imbalances due to the presence of variable loads inside the round angle of the mechanical member, or part of said round angle. The variable loads are generated by the geometries of the individual device to be commanded.

The movements of these systems can have a fixed duration cycle, or a variable duration cycle.

It must also be taken into consideration that the cycles can be carried out with a high cadence in the unit of time, for example inside a minute.

Normally the movements of these systems must be very precise, both to prevent possible interference between the different mechanical members of the automation units, and also for the correct execution of the different steps of the method that the individual cycle achieves. It should be noted that a cycle can concern one round angle or more, or it can be a fraction of a round angle, given that it is the sum of said fractions making up one round angle, or more, of the mechanical member.

According to the present invention, by mechanical members we mean drums, cranks, pantographic systems, cams or other, according to the specific requirements of the processes that have to be done.

Document EP-A2-1,815,972, which can be considered the state of the art for the present invention, describes a control system for a pressing line in which the speed of the motor can be varied on the basis of a pressing or non-pressing condition of the line, on which the preamble of the independent claims is substantially based.

However, in general, one disadvantage of the state of the art is the fact that the control of the inertia of the individual automation unit is carried out considering the inertia constant for the whole cycle.

A second disadvantage is that the cycle is not analyzed in sub-phases, for example referring to the round angle of the mechanical member, but considering it as a single phase. Other disadvantages derive from different performances depending on the thermal drift, the wear and tear, the mechanical deformations, the variability of the friction, the variability of the resistances met and cogging of the motor.

The command and control systems of the known type, considering the operating cycle as a single phase, do not therefore allow to carry out in a detailed and point-by-point way the pre-defined program corresponding to the sub-phases that, all together, make up the cycle.

One purpose of the present invention is to supply a command and control method that guarantees that the different movements of the mechanical member, in relation to each sub-phase of a cycle, are as precise as possible in terms of angular position, angular speed and acceleration of the mechanical member.

Another purpose of the present invention is to achieve a command and control method that takes constant account of the different drift effects, and can intervene each time in a pre-defined and memorized program, or in some characteristic factors thereof, said intervention having the purpose of maintaining precision, for each sub-phase, in the operating values (speed, acceleration, position etc.) of the mechanical member.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

The invention is applied to direct motion automation units, where by direct motion we mean a motion in which the inertia of the electric motor is higher than twice the inertia of the mechanical member connected to the electric motor.

In accordance with the above purposes, the command and control method for an automation unit according to the invention provides that a central unit carries out controls on the operating functions of a mechanical member, directly or indirectly detecting the position of the mechanical member through a position transducer, connected either to the shaft of the electric motor or to the mechanical member itself, or by means of an entity that mathematically simulates the position of the drive shaft and/or the mechanical member.

According to a first formulation of the invention, at least the round angle, or more, of the mechanical member is divided into a plurality of sub-phases "n" each of which defines a predefined elementary unit relating to the reference axis (master) for the mechanical member.

In this formulation, therefore, the sub-phases are defined according to the position of the mechanical member that carries out the operating cycle.

According to a variant, the cycle is considered in terms of time and the sub-phases "n" are obtained as elementary units of time equal to fractions of the cycle time.

According to another variant, the sub-phases "n" are defined according to a mathematical entity that simulates the position of the drive shaft or of the mechanical member.

Therefore, on each occasion the sub-phases "n" represent intervals of position or time, or of the mathematical entities, and the sum of said elementary units, or intervals, corresponding to the sub-phases "n" is equal to at least a round angle, or part of it, of the mechanical member.

According to the invention, the elementary units or sub-phases "n" usable in the control method are in the order of one three hundred and sixtieth of a finite cycle of the master reference axis. The value of the sub-phase "n" equal to one three hundred and sixtieth of a cycle is a preferential value, but other values can also be adopted, for example one hundredth, or one seven hundredth or more, given that the value according to the present invention is a minimum of "n" equal to a multiple of the elementary units considered, said multiple being at the minimum a factor of two.

Depending on the operating condition to be achieved in relation to the individual sub-phase or sub-phases "n", the central unit sends a current reference (feed forward) to the electric motor, in a quantity that is a function, for example but not only, of the instantaneous inertia and the instantaneous acceleration of the mechanical member, evaluated in relation to the specific sub-phase "n", or of the multiple of "n", reading the corresponding parameters in the data memorized in suitable tables provided in the central unit.

In some forms of embodiment of the invention, these parameters can be predefined, and therefore, as stated above, memorized in suitable tables or data bases, or self-learned according to a self-learning cycle managed by the central unit, during the execution of the cycle.

The degree of precision of the control according to the present invention is subject to the delay in the reply by the central unit. Today such delay is in the order of a millisecond; if this delay is varied, the angular amplitude of the control sub-phase "n", or multiple of "n", can vary.

In the conditions identified, the amplitude of the sub-phase "n", or multiple of "n", allows to have an efficient and point-by-point control so as to guarantee precision of positioning, speed and acceleration of the various mechanical members.

Depending on the function and the characteristics that each mechanical member must perform, the motion profile that the mechanical member must follow is provided inside a complete cycle.

The presence of possible drifts caused for example by friction, wear, increases in temperature, cogging and inertial imbalances, etc., can determine errors in positioning and/or speed and/or acceleration available from the mechanical members. The control method according to the invention intervenes by acting at the moment when the current reference (current feed forward) corresponding to each sub-phase "n" or each multiple of "n" is sent to the electric motor that drives the mechanical member, so that basically these drifts are cancelled. In this way, the tracking error is progressively brought to zero.

According to a variant, the method provides that the control unit sends a speed reference (speed feed forward) relating to each sub-phase "n", or multiple of "n".

According to another variant, the method provides that the control unit sends a position reference (position feed forward) relating to each sub-phase "n", or multiple of "n".

According to a further variant, the method provides to modify the gains of a control ring for each sub-phase "n", or multiple of "n".

The purpose of the present invention is to make possible, in the current state of electronic technology, work cycles of the mechanical member in the range of around 600 cycles per minute.

According to the invention, in the case given by way of example where a current reference (feed forward) is sent to the electric motor, an intensity of current in relation to each sub-phase "n", or multiple of "n", is sent, which is subject to the following algorithm:

$$IC = f(A, B)$$

where:

IC=is the current reference.

A=is a contribution of current calculated so that the tracking error is kept to a minimum. This contribution is memorized point-by-point during a self-learning procedure at every sub-phase "n" and/or loaded from predefined tables. The self-learning procedure verifies the position of the cycle (sub-phase "n", or multiple of "n") and the cadence of the cycle, memorizing the values A in a corresponding table;

B=is the sub-phase "n" or multiple of "n", inside the cycle.

According to the invention, in order to determine the current reference value, in an evolutive variant of the algorithm, the following additional factors are also considered:

C=is the point-by-point speed that the mechanical member should have in relation to the cadence of the cycle, which can be variable;

D=is the first derivative of the speed that the mechanical member should have in relation to the cadence of the cycle, which can be variable;

E=is the instantaneous inertia of the mechanical member which can be variable and/or memorized during a self-learning procedure. The self-learning procedure verifies the position in the cycle (sub-phase "n", or multiple of "n") and the cadence of the cycle itself, memorizing the values E in a corresponding table;

F=is the jerk, that is, the second derivative of the speed that the mechanical member should have in relation to the cadence of the cycle, which can be variable.

The references to the mechanical member can be learnt directly from the mechanical member or, for example, directly from the shaft of the electric motor.

According to a further form of embodiment, factor A (current contribution) is corrected by the algorithm also in relation to the thermal drift and can be memorized during a self-learning/self-calibration procedure.

According to a further feature, also at least one of the factors C, D, E and F are corrected by the algorithm in relation to the thermal drift. Factor F can be memorized during a self-learning/self-calibrating procedure. The other possible variants, as identified above, according to the present invention, follow the philosophy described above in relation to the specific algorithm connected to the sending of the current reference and the management of the thermal drift.

It must be noted that the method according to the invention is conditioned above all by the hardware currently available: if the response capacity is improved, the system too can be improved, and can therefore be considered as automatically up-dated.

According to the invention, detection means or position transducers, or entities that mathematically simulate the position of the drive shaft are associated to the shaft of the drive member, so as to prevent peaks, friction, phase shifts or play.

DESCRIPTION OF THE DRAWINGS

These and other characteristics of the present invention will become apparent from the following description of one form of embodiment, given as a non-restrictive example with reference to the attached drawings wherein.

To facilitate comprehension, the same reference numbers have been used, where possible, to identify identical common elements in the drawings.

DESCRIPTION OF A FORM OF EMBODIMENT

With reference to the attached drawings, a method to command and control an electric motor according to the present invention is usable for automation units. Said automation units are used in various fields, and the only relevant fact is that, between the drive member, hereafter electric motor 12, and the mechanical device, hereafter mechanical member 13, governing the operating functions required, there are no reductions, or the reductions are limited up to around a value of 10.

Figure 1:
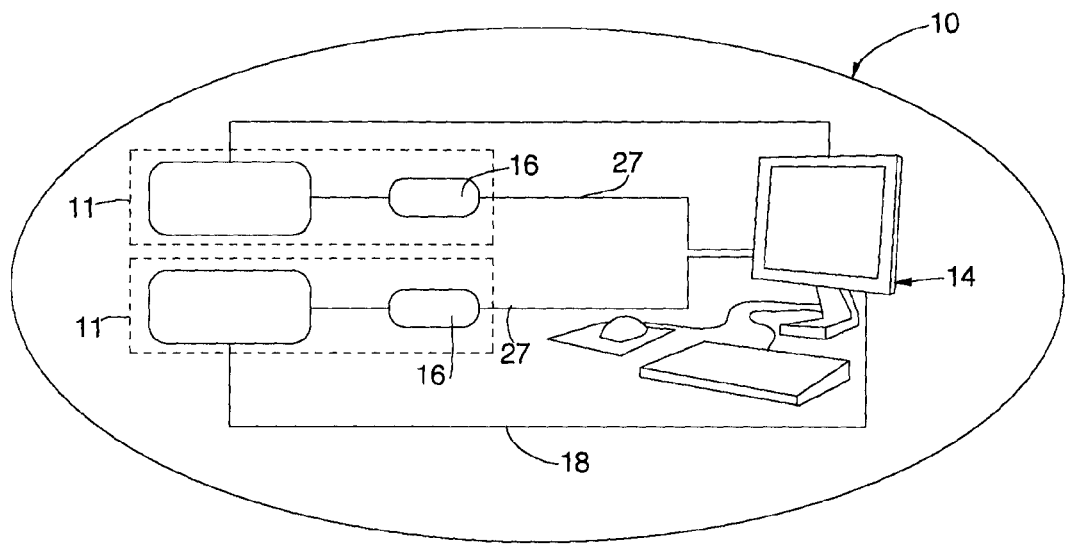
FIG. 1 is a schematic view of an automation unit with two operating units on which the command and control method according to the present invention is applied.

With reference to FIG. 1, in the case given by way of example, an automation unit 10 consists of two operating units 11 each having means to detect the position, or position detection means, 16 of the electric motor 12 and/or of the mechanical member 13. The position detection means 16, which in this case are directly connected to the shaft of the electric motor 12, detect the angular position thereof, and provide the point-by-point and precise angular position of the drive shaft 15 and of the mechanical member 13 to the central command and control unit 14 (FIG. 1).

The position detection means 16 and the central command and control unit 14 are connected by data connection lines 27. It should be noted that the position detection means 16 can consist of a position transducer associated to the drive shaft 15 or associated to the mechanical member 13. A mathematical entity that simulates the position of the drive shaft 15 or of the mechanical member 13 can also be used. Hereafter, in the term "position detection means 16" all these variants adopted on each occasion are included.

For each cycle unit (or sub-phase "n", or multiples of "n"), in the case given here by way of example, the central command and control unit 14 generates and sends a value of current reference in feed forward mode, for example obtained by self-learning techniques, and possibly corrected depending on the thermal drift.

In fact, the central command and control unit 14 is configured and programmed to define a determinate work program of the operating units and therefore of their electric motors 12. Connection lines 18 perform the function of transferring to and from the central command and control unit 14 the command and control information coming from, or sent to, the individual operating unit 11. It is indifferent whether the data connection lines 27 and 18 are the physical or wireless type, or another type.

Figure 2:
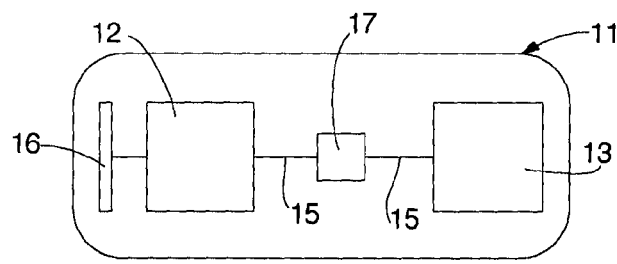
FIG. 2 is a detail of a component in FIG. 1.

The individual operating unit 11, as shown in FIG. 2, comprises an electric motor 12, which advantageously but not necessarily is the brushless type, and a mechanical member 13 intended to physically perform the operating step. The mechanical member 13 and the electric motor 12 are respectively connected through a drive shaft 15 to a possible reduction unit 17 that has at most a reduction around a value of 10. Given the low reduction value, the electric motor 12 and the mechanical member 13 are considered as connected directly, achieving what is called "direct motion". For each complete operating cycle of the operating unit 11, in this case the drive shaft 15, during its normal functioning, carries out a complete rotation (round angle) and/or more, and/or partial, during which it performs the expected work phase or phases.

Figure 3:
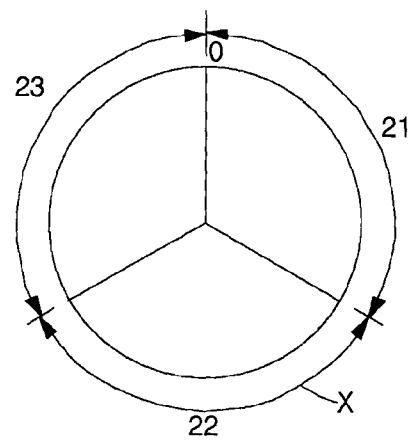
FIG. 3 schematically shows the distribution of the work phases of a component of the device in FIG. 1.

FIG. 3 schematically shows a cycle, for example corresponding to "x" degrees of rotation of the angle of the drive shaft. It should be remembered that FIG. 3 can also be in relation to the time cycle or the round angle made by the mechanical member in order to carry out the cycle.

For each sub-phase, indicated respectively by 21, 22, 23, the algorithm according to the invention is applied and the central command and control unit 14 sends a corresponding value (feed forward) of current, obtained for example by means of self-learning, or pre-memorized in tables, and corrected to prevent possible thermal drifts.

Figure 4:
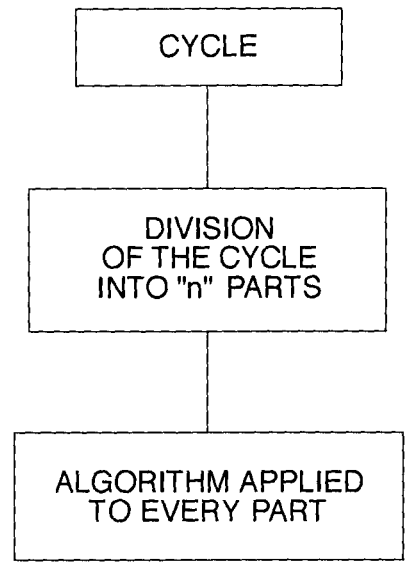
FIG. 4 is a simplified flow chart that highlights the concept of the sub-phases "n" on which the method according to the invention is applied.

FIG. 4 shows a simplified flow chart that shows the general functioning principle of the command and control performed by the central command and control unit 14. The cycle underlying the angle of rotation of the drive shaft 15 of the electric motor 12, that is, the cycle time, is divided into equal sub-phases "n" ("n" in the case shown here is equal to 360°). Each sub-phase "n" (indicated by 21, 22 and 23 in FIG. 3), is managed individually by the central command and control unit 14 which, in each of these sub-phases "n", carries out the different controls provided.

It should be remembered that the control and the management could also be carried out for each multiple of "n".

It should also be remembered that each phase of the cycle can be characterized by a control and commanded on the basis of "n" or multiples of "n" characteristic of the specific phase.

Figure 5:
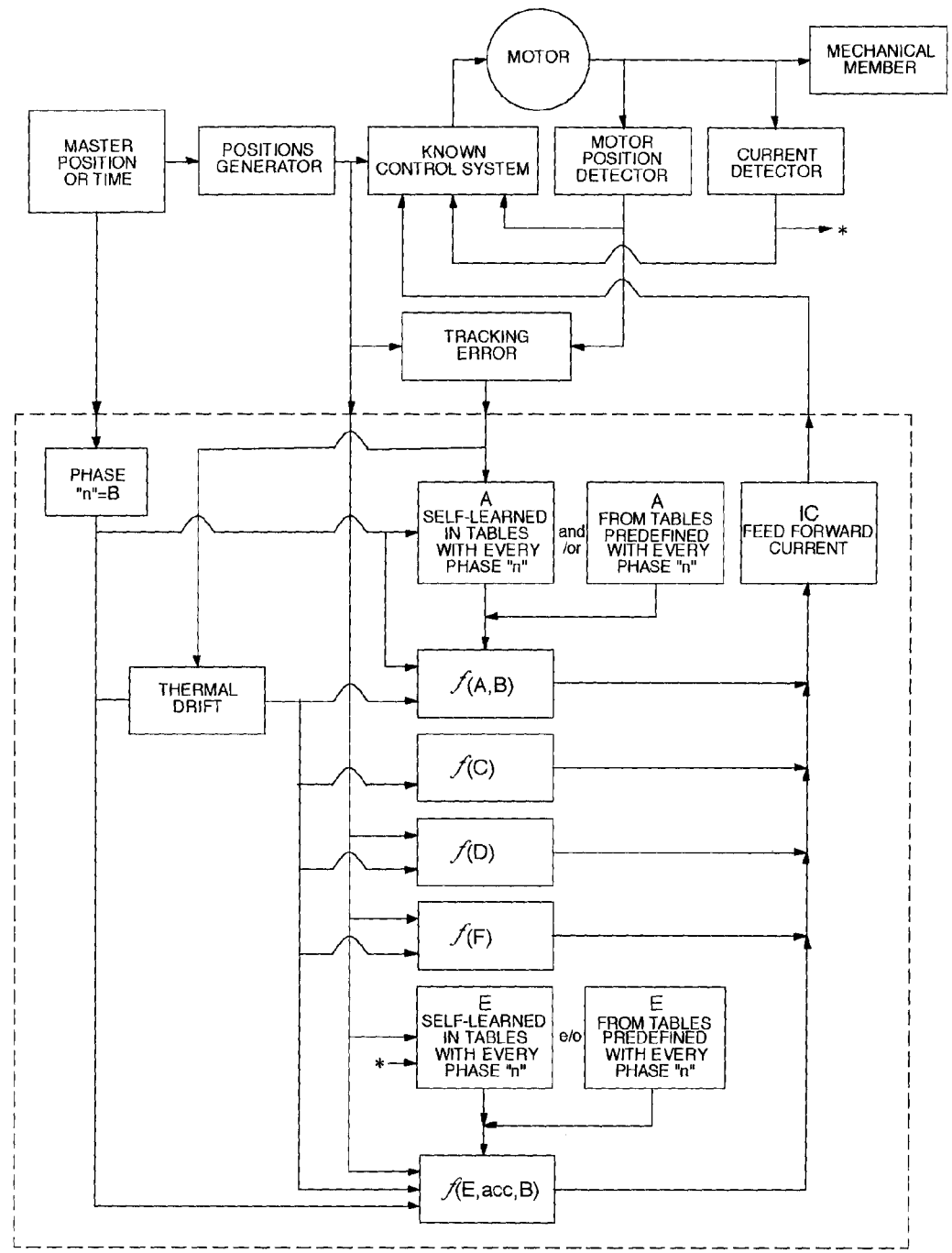
FIG. 5 is a simplified flow chart of the algorithm according to the present invention.

FIG. 5 shows a flow chart that represents the different phases that the central command and control unit 14 carries out to manage and control the automation unit 10. In the drawing the reference numbers have the following meanings: A corresponds to the self-learnt current contribution sent by the central command and control unit 14 to the electric motor 12; B corresponds to the specific sub-phase "n" or multiples of "n"; C corresponds to the speed; D corresponds to the acceleration; E to the instantaneous inertia; F to the jerk, which is the derivative of the acceleration.

During the activity of the operating unit 11, the drive shaft 15 varies its angular position which is detected, by means of the position detection means 16, by the central command and control unit 14 in order to establish in which operating phase the operating unit 11 is.

Once the specific sub-phase "n" in which the operating unit 11 is has been determined, the central command and control unit 14 retrieves the work parameters that are provided by the program, and applies the control algorithm that, as a result, sends a current reference (feed forward) to the electric motor 12, which is a function of the position of the cycle (sub-phase "n", or multiple of "n"), so as to allow to overcome the discrepancies and to align the mechanical member 13 as provided by the program.

With the method according to the invention, it has been shown that the self-learning procedure, thanks to the current contributions sent by the central command and control unit 14, allows to eliminate the tracking error and to determine a motion profile coherent with what has been set in relation to the individual sub-phases of the cycle, thus optimizing the control of the motor and the execution of the operations by the mechanical member 13.

Figure 6:
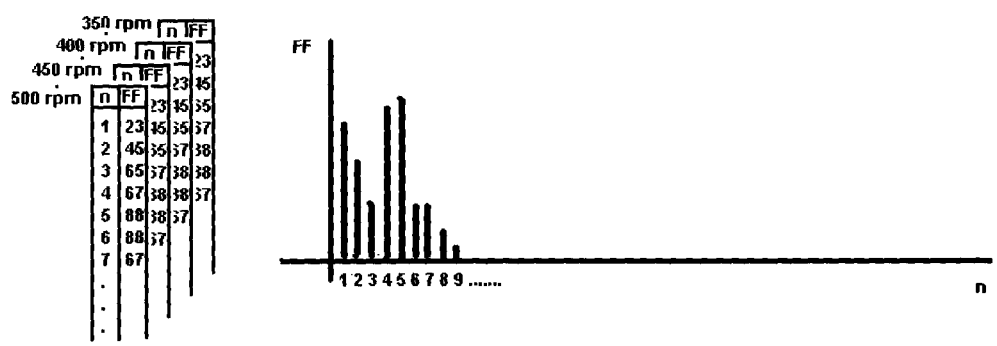
FIG. 6 is a diagram that shows the sending situation of a current value (feed forward) for each sub-phase in the execution of the method according to the invention.

FIG. 6 shows an example of the execution of the algorithm according to the present invention in which the values of the current reference in feed forward (FF) concerning the specific sub-phase of the cycle (n=1, 2 ..., 7, ...) and corresponding to a determinate rotation speed of the master reference axis (drive shaft 15 or mechanical member 13) are memorized in self-learnt tables. In the table it can be seen how the specific and differentiated values of the current reference can be sent from the central command and control unit 14, in order to optimize the control of the operating cycle depending on the specific phase, and so as to minimize the tracking error after the self-learning procedure has been carried out.

In this way, the operating cycle is optimized, also as a function of the thermal drifts, friction, cogging or other, specific for each individual phase.

It is clear that modifications and/or additions of parts may be made to the automation unit as described heretofore, without departing from the field and scope of the present invention.

It is also clear that, although the present invention has been described with reference to some specific examples, a person of skill in the art shall certainly be able to achieve many other equivalent forms of automation unit, having the characteristics as set forth in the claims and hence all coming within the field of protection defined thereby.

The invention claimed is:

1. A method for optimized commanding and controlling of an automation unit, the method comprises the following steps:
providing a central command and control unit,
performing at least a portion of a complete round angle rotation by a mechanical member connected to and driven by a shaft of an electric motor;
acquiring, by the central command and control unit, position signals of at least a portion of a complete round angle rotation;
dividing at least a portion of the round angle equally into one or more sub-phases;
selecting, by the central command and control unit, a reference current based on a self-learning step, wherein the self-learning step comprises:
verifying, by the central command and control unit, the position for the one or more sub-phases in the operation circle and the cadence of the operation cycle, and
storing, by the central command and control unit, values of the reference current in a corresponding database for each sub-phases, wherein the reference current is selected based on one or more factors among an instantaneous tracking error, a reference instantaneous speed of the mechanical member, a first derivative of the reference instantaneous speed of the mechanical member, a second derivative of the reference instantaneous speed of the mechanical member, and an instantaneous inertia of the mechanical member in relation to the cadence of the operation cycle, and wherein at least the instantaneous inertia of the mechanical member is adjustable;
generating a correcting signal based on an instantaneous reference current so that for the one or more sub-phases at least positions, speeds, and accelerations of the mechanical member substantially correspond to the instantaneous values of the at least positions, speeds, and accelerations of the mechanical member.

2. The method of claim 1, wherein the connection between the shaft and the mechanical member is a direct motion type connection and the direct motion is a motion in which an inertia of the electric motor is lower than twice of an inertia of the mechanical member.

3. The method of claim 1, wherein each sub-phase corresponds to at least a portion of round angles performed by the shaft.

4. The method of claim 1, wherein each sub-phase corresponds to an elementary unit of time into which an overall duration representing the time taken to complete at least the round angle or part of it is divided.

5. The method of claim 1, wherein each sub-phase corresponds to an elementary unit resulting from a mathematical entity which simulates the position of the shaft and/or the mechanical member.

6. The method of claim 1, wherein the current reference is also corrected in relation to the thermal drift determined for example by frictions or by other types of thermal drift, of the mechanical and electrical components of said automation unit (10).

7. A system for performing the method of claim 1 wherein comprising
a mechanical member performing at least a portion of a complete round angle rotation,
an electric motor having a shaft coupled to the mechanical member,
a position detection means for detecting instantaneous positions of the shaft and/or the mechanical member, and
a central command and control unit, communicating with the electric motor and the position detection means, wherein the central command control unit is configured to acquire position signals of the shaft and/or the mechanical member, divide at least a portion of a round angle equally into one or more sub-phases, select a reference current based on a self-learning step, generate a correcting signal based on an instantaneous reference current so that for one or more sub-phases at least positions, speeds, and accelerations of the mechanical member substantially correspond to instantaneous values of the at least positions, speeds, and accelerations of the mechanical member
wherein the self-learning step comprises:
verifying, by the central command and control unit, the position for the one or more sub-phases in the operation circle and the cadence of the operation cycle, and
storing, by the central command and control unit, values of the reference current in a corresponding database for each sub-phases, wherein the reference current is selected based on one or more factors among an instantaneous tracking error, a reference instantaneous speed of the mechanical member, a first derivative of the reference instantaneous speed of the mechanical member, a second derivative of the reference instantaneous speed of the mechanical member, and an instantaneous inertia of the mechanical member in relation to the cadence of the operation cycle, and wherein at least the instantaneous inertia of the mechanical member is adjustable.

* * * * *